United States Patent [19]
Zheng

[11] Patent Number: 5,850,283
[45] Date of Patent: Dec. 15, 1998

[54] DETERMINATION OF ANGULAR POSITION OF WEAK AXIAL ASYMMETRIES OF OPTICAL FIBERS AND ALIGNMENT OF AND SPLICING FIBERS

[75] Inventor: Wenxin Zheng, Solna, Sweden

[73] Assignee: Telefonaktiebolaget LM Ericsson, Stockholm, Sweden

[21] Appl. No.: 895,573

[22] Filed: Jul. 16, 1997

[30] Foreign Application Priority Data

Jul. 19, 1996 [SE] Sweden .................................. 9602821

[51] Int. Cl.$^6$ .................................................. G01N 21/00
[52] U.S. Cl. ........................................................ 356/73.1
[58] Field of Search ............................................ 356/73.1

[56] References Cited

U.S. PATENT DOCUMENTS 5,323,225  6/1994  Dyott ...................................... 356/73.1
5,572,313  11/1996  Zheng et al. .

FOREIGN PATENT DOCUMENTS 319 041  6/1989  European Pat. Off. .
707 226  4/1996  European Pat. Off. .
774 678  5/1997  European Pat. Off. .

WO95/14945  6/1995  WIPO .

*Primary Examiner*—Frank G. Font
*Assistant Examiner*—Reginald A. Ratliff
*Attorney, Agent, or Firm*—Burns, Doane, Swecker & Mathis, L.L.P.

[57] ABSTRACT

In determining the angular rotational position of axial asymmetries of bodies like optical PM-fibers such a body or fiber is illuminated during rotations thereof to different angular positions around its longitudinal axis. For different angular positions the difference is then determined between light, which has passed through the fiber end and in its position corresponds to the central part of the fiber, and light, which has passed through the fiber end and in its position corresponds to the region of the fiber located immediately outside the central part. These differences, considered as a function of the rotation angle, constitute a curve that is analyzed for finding the regions thereof having the steepest descent or increase, such as a valley region. Only these regions are then used for determining the position of the optical asymmetries. Thus the fiber can be rotated during only this interval determining the curve more accurately by using more densely spaced measurement points within the interval. Such a determination is particularly suited for PM-fibers having very small optical asymmetries such as fibers having an elliptical core.

21 Claims, 3 Drawing Sheets

DETERMINATION OF ANGULAR POSITION OF WEAK AXIAL ASYMMETRIES OF OPTICAL FIBERS AND ALIGNMENT OF AND SPLICING FIBERS

The present invention relates to methods and devices for determination of the angular position about a longitudinal axis of an optical body or fiber which is axially asymmetric about the same longitudinal axis in regard of its optical properties, for positioning such a body or fiber in a chosen angular position of the axial asymmetry and for aligning two such bodies or fibers so that the positions of the axial asymmetries coincide or are aligned with other, and for the case of two optical fibers, splicing ends of the fibers to each other maintaining the alignment of asymmetries.

BACKGROUND

In a prior method for an angular alignment of e.g. PM-fibers in order to splice two such fibers correctly, see International Patent Application No. PCT/SE94/01146, which is incorporated herein by reference, a correlation method was applied directly to intensity profiles (POL profiles, POL=Polarization Observation by the Lens effect tracing) obtained from the two fibers to be spliced. This method can be called the direct correlation method. The angular offset between the two fibers was then found from the location of the maximum correlation point. One of the two fibers was finally rotated to eliminate the angle offset in order to get the maximum extinction ratio in a splice. After the rotation alignment, the angular offset between the two fibers is almost zero. However, both the initial rotational, relative position of the two fibers is random and, even worse, the final angular position after splicing is random which causes some problems. An indirect correlation method using the same kind of intensity profiles has been disclosed in European Patent Application No. 96850176.6, filed Oct. 24, 1995, which is also incorporated herein by reference. Here a refined correlation value is calculated, using a curve fitting technique.

The direct correlation method is suited for splicing two PM-fibers of the same type to each other, the indirect correlation method working well for splicing both the same type of and different types of PM-fibers to each other. Using the direct and the indirect correlation methods, the angle offset of the optically inhomogeneous regions in the two fibers can be found with a rather high accuracy, e.g. an angle-offset error $<\pm 1.5°$, corresponding to a lowest extinction ratio of 31 dB, for those fibers having a rather large POL-value variation, e.g. a maximum to minimum of POL data contrast >20 grey scale units of the totally 256 grey scale units that can be measured in an automatic fiber splicer of the type FSU 925 fabricated by ERICSSON. Those fiber types include PANDA, Bow-tie, Andrew elliptical core, Hitachi elliptical cladding, and other types of elliptical cladding fibers. All those fiber types are constructed to have a rather large asymmetry of their refractive index as seen in a rotational or circumferential direction.

However, for the types of PM-fibers having a small asymmetry of their refractive index in a rotational direction such as Corning elliptical core, Hitachi elliptical core, Lycom elliptical core, and 3M low stress elliptical cladding fibers, the POL data contrast is normally less than 10 grey scale units in the automatic fiber splicer FSU 925. A simple application of the direct and the indirect correlation method will often result in a low alignment accuracy (angle-offset error $\approx \pm 2.5°$, corresponding to a mean extinction ratio of 27 dB). Many optical fiber gyro makers specify the lowest splice extinction ratio as high as 30 dB. The $\pm 2.5°$ alignment accuracy is then too low to satisfy this requirement. Moreover, those PM fiber types having small asymmetries of their refractive index in a rotational direction are getting more and more popular in the world market, because of their low price ($\frac{1}{10}$ to $\frac{1}{20}$ price level compared with the traditional PM fiber types).

There is thus a need for methods and devices for automatically aligning and splicing PM fibers of all types without using measurements of the active kind, i.e. for aligning fibers of all types with a better accuracy than is possible using the prior methods.

SUMMARY

It is an object of the invention to provide a method and a device for determining the angular position of optical asymmetries of e.g. PM-fibers and generally optical fibers and similar cylindrical bodies which are optically asymmetric, as seen in the longitudinal direction of such a fiber or body, in particular for fibers or bodies where these asymmetries are small.

The problem to be solved by the invention is thus to provide methods and devices for aligning optical PM-fibers having weak axial asymmetries to each other with an alignment error that is as small as possible, for allowing splices to made having low extinction ratios.

Thus generally, the angular position is to be determined, as taken about an longitudinal axis, of at least one axial optical asymmetry such as at least one optically inhomogeneous region, that is located in parallel to the longitudinal axis of a cylindrical body. This body is in the preferred case an optical fiber and it is supposed to be located in an arbitrary angular start position about its longitudinal axis. A POL profile is to be measured for the body and then some means must be used for illuminating the body with a light beam. The illuminating means can for example be arranged to provide a parallel light beam and/or to give the light beam a direction that is substantially perpendicular to the longitudinal direction of the body. Rotating means are used for rotating the body through an angular interval of a suitable first length. The interval is at least half a full turn since for example optical PM-fibers always have a two-fold symmetry and preferably the interval is a full turn, as measured from the angular start position when the body is rotated about its longitudinal axis. Finally, means must be provided for determining, during the rotation, for different angular positions the difference between the light intensity of light which has passed through the body and in its position corresponds to the central longitudinal portion of the body and of light which has passed through the body and in its position corresponds to the region adjacent to the longitudinal central portion of the body.

For making a refined measurement analysis means are used for determining, from the determined differences as a function of the rotation angle starting from the start angular position, at least one rotation angle interval, where the function is steepest or has its most rapid variation, that is where the function is strictly decreasing or increasing and has the highest absolute value of its derivative. This angle interval can be set to have a predetermined length such as a fourth of a full turn. Evaluation means are used for evaluating the function values within this or these intervals for determining a value of the angular position of the least one optical asymmetry in relation to the start angular position of the body or a value of the angular position of the body in relation to some fixed reference angular position of the body.

A curve-fitting method as mentioned above can be used and then comparing means are used for comparing, after the determination of the differences as a function of angular values of the first interval, these differences to a predetermined function of the angular argument. This predetermined function should have substantially the same basic shape as the difference function, where the kind of predetermined function could always have been determined in advance for the type of body or fiber to be measured. The comparison is used for finding an angular value that when used for translating the argument of the predetermined function gives the best agreement between the determined differences and the translated argument function values. This angular translational value will then be a first value of the angular rotational position of the body.

The means for evaluating the difference function values within the interval or intervals having the most rapid variation are then arranged to compare the function values to said predetermined function for different small angular translations of the argument thereof from the first value. These means are then arranged to determine that small angular translational value which gives the best agreement of the compared functions and to take this translation value as a correction value added to the first value to produce a second, more accurate value of the rotational angular position of the body.

The means for determining at least an angular interval can preferably be arranged to determine only one contiguous interval having a second predetermined angular extension. The second extension will then obviously be smaller than the first extension and in particular it can be smaller than or equal to half the first extension. It is preferably equal to 90° as already indicated. The start and end angles of the interval are determined so that the interval contains or coincides with determined intervals where the function has its most rapid variation. Advantageously, the chosen interval encloses one interval of steep decrease and one interval of steep increase, where these intervals are separated only by one interval containing a minimum of the function. This contiguous interval is used by the evaluation means for evaluating the determined differences as a function of the rotation angle over again in order to determine a value of the angular position of the body.

For making a refined measurement, several new measurements can be made in the determined interval or intervals of most rapid variation. In particular, when only one contiguous interval is used, the rotation means are preferably arranged to also rotate the body about its longitudinal axis to the start angle of said contiguous interval and then through this interval for determining intensity differences at a higher resolution. The means for determining the difference of the light intensities during the rotation will then be arranged to also determine, for a predetermined second number of different angular positions, the difference between light intensity of light, which has passed through the body and in its position corresponds to the central portion of the body as seen in the longitudinal direction, and of light which has passed through the body and in its position corresponds to regions located most close to and outside the body. The evaluation means can then evaluate these determined differences as a function of the rotation angle over the contiguous interval in order to determine a value of the angular position of the body.

The method described above can be used in a splicing device for splicing the ends of two optical fibers which each one comprises at least one axial asymmetry, that usually comprises at least one optically inhomogeneous region that extends in the longitudinal direction of the fiber and is eccentrically located in relation to a longitudinal axis of the fiber. The splice is to be made with a predetermined angle between the angular positions of the axial asymmetries in the two fibers, usually with an alignment thereof. The splicing device comprises in the conventional way: means for placing the end surfaces of the optical fibers close to or at each other and opposite to each other with the longitudinal axes of the fibers essentially aligned with each other or at least essentially parallel to each other; means for connecting the fiber ends to each other; means for rotating the ends of the fibers about their longitudinal axes in relation to each other through an angular amount. The splicing device is also capable of determining angular position and thus has means for determining the angular position of the optical asymmetry of each fiber end as recited above. Further, the rotation means are arranged to use these values for rotating at least one of the fiber ends to align the optical asymmetries of the fiber ends. In such a splicing device the illumination means used for determining the light intensity differences can suitably be a light source that produces a light beam arranged to simultaneously and from the sides thereof hit and illuminate the fiber ends when they are located close to each other.

BRIEF DESCRIPTION OF THE DRAWINGS

The invention will now be described by way of a non-limiting embodiment with reference to accompanying drawings in which.

DETAILED DESCRIPTION

Figure 1A:
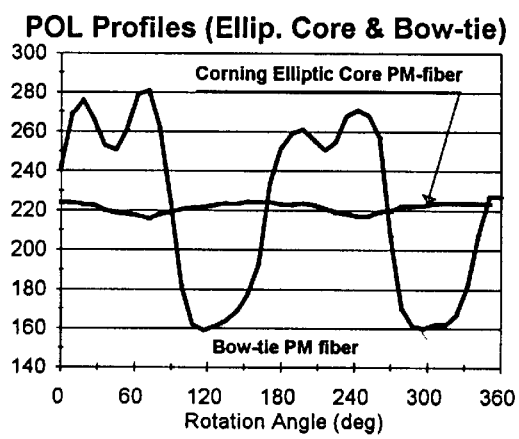
FIG. 1a is a diagram illustrating POL profiles for a bow-tie PM-fiber and for an elliptical core fiber.

Two typical types of POL profiles are plotted and compared in FIG. 1a. The POL profile is generally the largest light intensity difference between light passing centrally through a fiber and light passing through other parts of the fiber, as taken for different angular positions of the fiber around its longitudinal axis, the diagram of FIG. 1a thus showing this difference or "height" measured in some unit (grey-scale units) as a function of the rotation angle for two different fibers. The curve having a large variation with two double-peaks and steep valleys therebetween is measured for a traditional PM-fiber (Bow-tie type) having a large rotational refractive index asymmetry. The difference between the maximum and minimum POL values is about 120 grey scale units in the apparatus used. The other curve drawn, the nearly constant curve having only a small variation around the value 220, is measured for a typical new type PM-fiber (Corning elliptical core) having a small rotational refractive index asymmetry. The difference between its maximum and minimum POL values is only about 8 grey scale units. Since all camera and electronic systems have a certain noise level, that is about 1.5 grey scale units in the splicer used for measuring the curves, the magnified POL profile from the Corning E-core fiber as plotted in FIG. 1b, where only the grey scale values just around 220 are drawn, has a rather shaky and non-smooth appearance, due to the effect of a larger noise to signal ratio as compared to the curves of FIG. 1a.

Figure 1B:
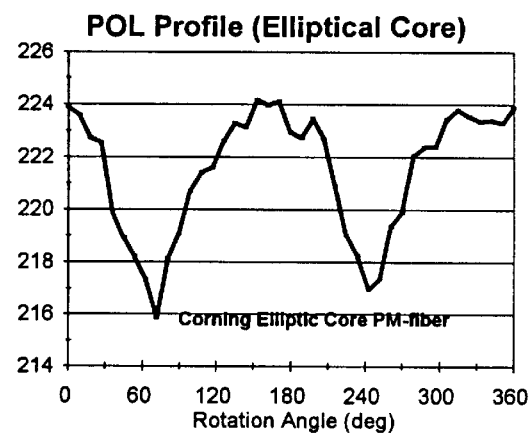
FIG. 1b is a diagram illustrating the POL profile for the elliptical core fiber of FIG. 1, where the vertical scale has been enlarged.

If the direct or the indirect correlation method, as described in the patent applications cited above, are applied for splicing fibers having a low contrast POL-profile of the kind illustrated in FIG. 1a, see the middle curve, and the same curve as enlarged in a vertical direction in FIG. 1b, a significant angle offset or error between the optically asymmetric portions in the splice would appear because of the non-negligible noise level. From a careful observation of FIG. 1b, one can find that different portions of the POL profile have different sensitivities to the angle variation. At the ravines or valleys of the profile, i.e. at the regions between 30° and 120° and between 210° and 300° FIG. 1b, the POL value changes relatively faster and is more sensitive to the angle variation. On the other hand, at the plateau part of the POL profile, i.e. in the portions outside said regions, the POL values are more sensitive to the noise instead of the angle variation. Then such a ravine or valley portion can be used for making a refined alignment.

Thus, after obtaining the POL profile over the full turn of a fiber, i.e. by measuring intensity differences when the fiber is rotated 360°, the subsequent analysis can be made only within a smaller angular range, such as 90°, for only the fiber rotational angles which correspond to that region of the POL profile for 360° where there is the largest variation of the curve shape. In this way we may get a higher degree of angular accuracy. Even, a new POL measurement can be made of only this angular range and, if the same number of measurements are made when determining such a 90° POL-profile as used for the rough analysis over 360°, the angular resolution will be even better.

The POL profile measurement and analysis for making an aligned splice of two fibers, a left fiber and a right fiber, are then performed in two ranges. First, full range POL profiles over a 360° rotation of each fiber end are analyzed to find out a rough angular offset, and then similar profiles over a narrow variation range are analyzed. Generally, there are always two suitable, similar narrow regions having a strong variation that can be used and are located 180° apart or opposite each other. One such region must be chosen. Then the left fiber is rotated to the starting point of the narrow region. The right fiber is rotated to remove the angular offset of the optical axial asymmetries. By obtaining POL profiles of both fibers with a higher resolution within this narrow angular region, e.g. 90°, a value having a higher accuracy of the remaining angular offset will be determined and then this offset is removed by the further rotations as mentioned of the fiber ends.

The disadvantage of this method is that the time period required for the aligning will be 20 seconds longer than in the conventional method, since one more POL measurement, determination and analysis is required.

In order to make a further check of different accuracy of the indirect correlation method using the full turn or 360° POL profile and the 90° POL profile at the ravines of the profile, the angle offset errors were measured and are listed in Table 1. A higher alignment accuracy is observed when using the 90° range.

TABLE 1

Measured angular offset error for different POL profile ranges

| No. of test | 360° range Angular offset | 90° range Angular offset |
|---|---|---|
| 1 | −0.6 | −0.3 |
| 2 | +1.2 | +0.75 |
| 3 | +1.9 | +0.45 |
| 4 | +1.05 | −0.15 |
| 5 | −1.35 | +0.9 |
| 6 | +1.5 | +0.15 |
| 7 | −2.3 | −0.6 |
| 8 | +0.2 | +1.1 |
| 9 | +1.8 | +0.65 |
| 10 | −0.15 | −0.25 |
| Average of absolute offset values | 1.205 | 0.53 |
| Maximum of absolute offset values | 2.3 | 1.1 |
| Standard deviation of offset values | 0.682 | 0.309 |

Several splices test were made and the extinction ratios after splicing were measured. The equipment for measurement and splicing had the following characteristics:

| | |
|---|---|
| LED wavelength | 855 nm |
| Spectrum width | 24 nm |
| Setup Extinction ratio | 38 dB |
| Polarizer Extinction ratio | 39 dB |
| Light Detector | HP 8153 with 800–900 ~ wide angle detector |
| PM Fiber type | Corning elliptical core |
| PM Fiber length | 3.5 m |
| Splicer | ERICSSON FSU 925 PMA with modified software |
| Parameters of Splicing | |
| Prefusion time | 0.2 s |
| Prefusion current | 7.0 mA |
| Gap | 30.0 μm |
| Overlap | 8.0 μm |
| Fusion time 1 | 0.2 s |
| Fusion current 1 | 8.0 s |
| Fusion time 2 | 3.0 s |
| Fusion current 2 | 12.6 mA |
| Fusion time 3 | 0.0 s |
| Fusion current 3 | 0.0 s |

TABLE 2

Splicing results using full turn range and indirect correlation method

| No. of splice | Measured extinction ratio (dB) | Estimated extinction ratio (dB) | Estimated loss (dB) |
|---|---|---|---|
| 1 | 31.4 | 29.4 | 0.02 |
| 2 | 35.0 | 33.1 | 0.04 |
| 3 | 26.7 | 25.9 | 0.03 |
| 4 | 27.8 | 32.4 | 0.03 |
| 5 | 25.6 | 28.8 | 0.03 |
| 6 | 36.1 | 34.5 | 0.04 |
| 7 | 30.2 | 37.2 | 0.03 |
| 8 | 29.3 | 24.8 | 0.04 |
| 9 | 34.5 | 34.1 | 0.03 |
| 10 | 32.7 | 27.9 | 0.04 |
| Minimum | 25.6 | 30.82 | 0.033 |
| Mean | 30.93 | 30.82 | 0.033 |

TABLE 2-continued

Splicing results using full turn range and indirect correlation method

| No. of splice | Measured extinction ratio (dB) | Estimated extinction ratio (dB) | Estimated loss (dB) |
| --- | --- | --- | --- |
| Standard deviation | 3.45 | 3.85 | 0.0064 |

TABLE 3

Splicing Results using additional narrow range analysis

| No. of splice | Measured extinction ratio (dB) | Estimated extinction ratio (dB) | Estimated loss (dB) |
| --- | --- | --- | --- |
| 1 | 34.70 | 34.22 | 0.02 |
| 2 | 33.90 | 33.92 | 0.04 |
| 3 | 35.20 | 35.72 | 0.04 |
| 4 | 35.87 | 36.30 | 0.03 |
| 5 | 36.27 | 37.08 | 0.03 |
| 6 | 36.80 | 36.84 | 0.03 |
| 7 | 36.74 | 36.30 | 0.04 |
| 8 | 35.40 | 33.34 | 0.03 |
| 9 | 37.55 | 37.31 | 0.03 |
| 10 | 34.32 | 35.72 | 0.04 |
| 11 | 33.87 | 33.92 | 0.03 |
| 12 | 34.14 | 37.68 | 0.03 |
| 13 | 35.02 | 36.57 | 0.02 |
| 14 | 29.70 | 33.92 | 0.04 |
| 15 | 34.42 | 35.42 | 0.03 |
| 16 | 30.40 | 33.34 | 0.03 |
| 17 | 36.40 | 37.08 | 0.02 |
| 18 | 34.22 | 34.22 | *0.11 |
| 19 | 28.50 | 33.63 | *0.15 |
| 20 | 33.63 | 36.57 | *0.11 |
| 21 | 33.40 | 35.12 | *0.12 |
| 22 | 31.72 | 36.01 | *0.09 |
| Minimum | 28.50 | 33.34 | |
| Mean | 34.19 | 33.34 | |
| Standard deviation | 2.28 | 1.39 | |

* Loss estimation made using non-standard mode field diameter (5 μm) instead of 9.8 μm.

Comparing tables 2 and 3. one can observe that the mean extinction ratio is raised by 3.2 dB and the standard deviation is reduced by 0.6 dB using the method comprising measurement and analysis also over a narrow range.

The above tests were made with CORNING Elliptical core (E-core) fiber. This fiber type has the smallest rotational refractive index asymmetry in all the known PM fiber types. Thus, it is the fiber for which it is most difficult to make an angular alignment having high accuracy of two fiber ends to be spliced. Better results can be expected for other fiber combinations, such as HITACHI E-core and LYCOM E-core.

Figure 3:
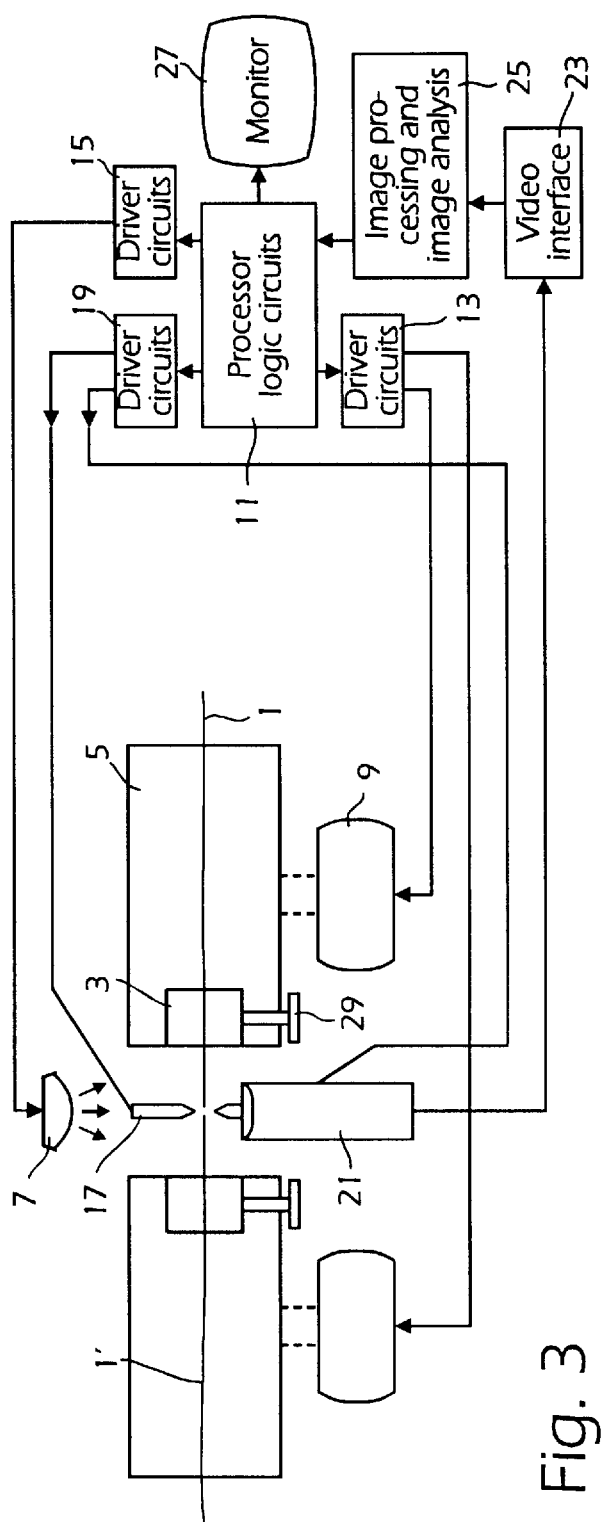
FIG. 3 is a schematic picture, partly in block diagram form, showing a device for splicing optical fibers.

A device for splicing two optical fibers is schematically shown in FIG. 3. This device is principally a conventional automatic splicing device for welding optical fibers to each other supplemented with devices for orienting the fibers angularly and provided with special routines for determining intensity curves and analysing them.

The two optical fibers 1, 1' which are to be spliced to each other, are placed with their ends in special retainers 3, by means of which the fiber ends can be rotated about their longitudinal axes. These retainers 3 are, in addition, arranged on the usual alignment supports 5 for the fiber ends of the splicing device. The fiber supports 5 can further be displaced in relation to each other in the perpendicular directions which are indicated by the directions of light rays from two lamps 7, and also in the longitudinal direction of the fiber ends by means of drive motors 9, which are controlled by logical circuits and software in a processor logic module 11 through suitable driver circuits 13. The lamps 7 are activated through their own driver circuits 15 by the processor logic 11. Welding electrodes 17 are driven by corresponding driver circuits 19 controlled by the processor logic circuits 11. A video camera 21 makes a picture of the fiber ends and provides the corresponding video signals through a video interface 23 to an image processing and image analysis module 25. The result of the image processing and the image analysis in this module 25 is fed to the processor logic module 11 and the result can be shown on a monitor 27. Also the directly obtained picture of the end regions of the fibers as depicted by the video camera 21 can be shown on the monitor 27.

Figure 2:
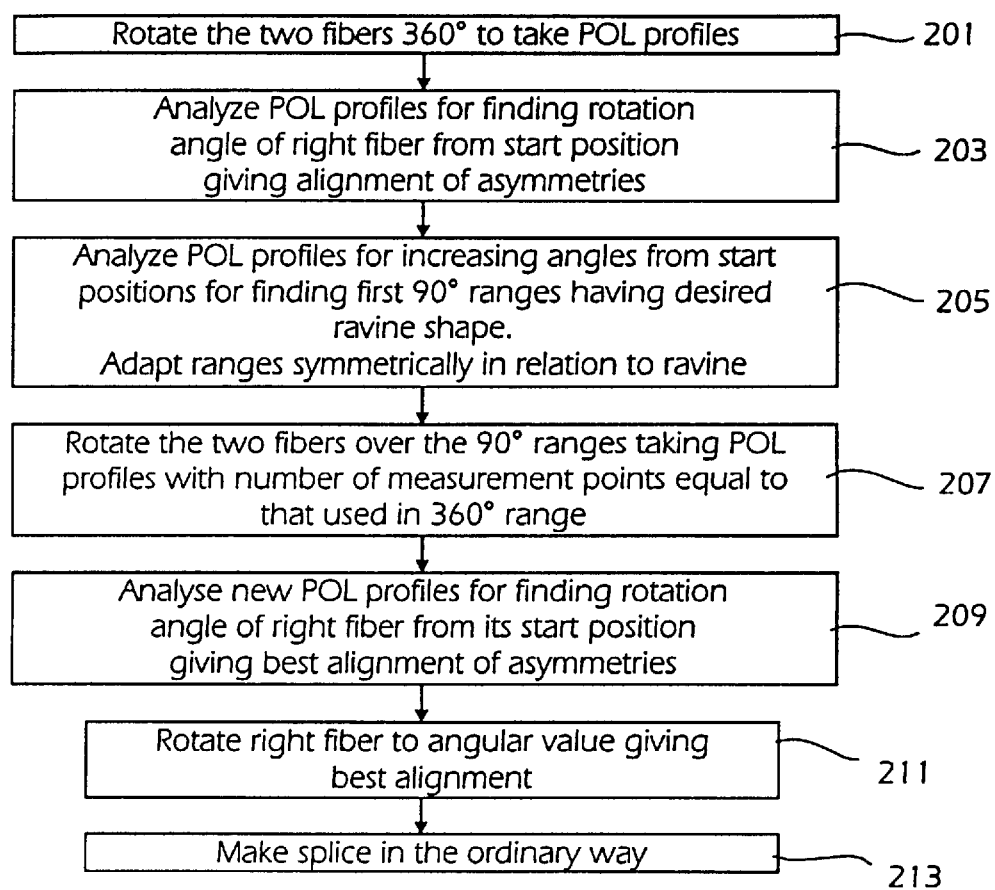
FIG. 2 is a block diagram illustrating a rotational alignment procedure using a refined method particularly suitable for PM-fibers having small optical asymmetries.

The procedure which is to be executed by the splicing machine of FIG. 3 when aligning and splicing two fibers having POL profiles of low variations by using an indirect correlation technique in the alignment step is also illustrated by the flow diagram of FIG. 2. This procedure will now be described with reference to FIGS. 2 and 3.

Thus, in a first step 201 the two fiber ends are rotated a full turn or 360°. This includes that an end of each fiber is mounted in a fiber splicer provided with rotational facilities. During the rotation, at equally spaced angular values, such as each 10°, the light intensity curves for lines passing perpendicularly to the fibers are determined and therefrom the differences are calculated to determine the POL profile or function. This profile can have a very small variation and in a block 203 it can be analyzed for finding the position of the optical asymmetries of the fibers in some way such as is described in the patent applications cited above. In a block 205 the profile is further analyzed for finding those angular regions or intervals where it has the most rapid variation, where of course those small, rapid variations owing to noise have been filtered away. This can be easily done by means of the curve fitting method described in the European patent application cited above. Then one interval is chosen which comprises or coincides with at least the major portion of a valley or ravine of the profile and preferably is located essentially symmetrically in relation thereto. Also, it could be possible to use only one "hill-side" of such a valley, that has a monotonic functional behaviour, but using a total valley will generally give a better accuracy.

Then, in a block 207 the two fiber ends are rotated during these new intervals determining POL profiles that are determined at angular values which are more densely spaced than at the first determination. Then only these new profiles are analyzed in a block 209 for finding the position of the axial asymmetries, e.g. by the method described in the European patent application cited above. In a block 211 at least one of the fiber ends is rotated to align the optical asymmetry therein with the optical asymmetry of the other fiber. Finally, in a block 213 the splice is made in some ordinary way such as by means of arc welding.

What is claimed is:

1. A method of determining the angular position about a longitudinal axis of at least one axial optical asymmetry located in parallel to the longitudinal axis of a cylindrical body, the body being located in an arbitrary angular start position about its longitudinal axis, comprising the steps of:

illuminating the body by a light beam in a direction crossing the body, the light beam comprising light for which the body is transparent, rotating the body through an angular interval having a first predetermined angular extension being at least half a full turn from the start angular position about the longitudinal axis, determining during the rotation, for a predetermined first number of different angular positions, the difference between light intensity of light, which has passed through the body and in its position corresponds to the central portion of the body as seen in the longitudinal direction, and of light which has passed through the body and in its position corresponds to regions located most close to and outside the central portion of the body, determining from the determined differences as a function of the rotation angle from the start angular position at least one rotation angle interval, where the function has its most rapid variation or where the function is strictly decreasing or increasing and has the highest absolute value of its derivative, and evaluating the function values within the at least one rotation angle intervals for determining a value of the angular position of the least one optical asymmetry in relation to the start angular position of the body or a value of the angular position of the body in relation to some fixed reference angular position of the body.

2. The method as claimed in claim 1, wherein in rotating the body through an angular interval having a first predetermined angular extension the first predetermined angular extension is a full turn.

3. The method as claimed in claim 1, comprising the further steps of:

comparing, after the determination of the differences as a function of angular values of the first interval, these differences to a predetermined function of the angular argument, this predetermined function having essentially the same basic shape as said difference function, to find an angular value that when used for translating the argument of the predetermined function gives the best agreement between the determined differences and the translated argument function values, this angular translational value being a first value of the angular rotational position of the body, and comparing, for evaluating the difference function values within the interval or intervals having the most rapid variation, the function values to said predetermined function for different small angular translations of the argument thereof from the first value and determining that small angular translational value giving the best agreement of the compared functions and taking this translation value as correction value added to the first value to produce a second, more accurate value of the rotational angular position of the body.

4. The method as claimed in claim 1, comprising the further steps of:

determining a contiguous interval having a second predetermined angular extension, the second extension being smaller than the first extension, the start and end angles of the interval being determined so that the interval contains or coincides with determined intervals where the function has its most rapid variation or so that the interval encloses one interval of steep decrease and one interval of steep increase, where these intervals are separated only by one interval containing a minimum of the function, and evaluating the determined differences as a function of the rotation angle over the contiguous interval for determining a value of the angular position of the body.

5. The method as claimed in claim 4, wherein the second extension is smaller than or equal to half the first extension or is equal to 90°.

6. The method as claimed in claim 4, comprising the further steps of:

rotating the body about its longitudinal axis to a start angle of said contiguous interval and then through the contiguous interval, determining during the rotation, for a predetermined second number of different angular positions, the difference between light intensity of light, which has passed through the body and in its position corresponds to the central portion of the body as seen in the longitudinal direction, and of light which has passed through the body and in its position corresponds to regions located most close to and outside the body, and determining from the determined differences as a function of the rotation angle from the start angular position a value of the angular position of the body.

7. A method of splicing the ends of two optical fibers each of which comprises at least one axial asymmetry, where the splice is to be made with a predetermined angle between the angular positions of the at least one axial asymmetries in the two fibers, the ends of the fibers comprising longitudinal directions and end surfaces, comprising the steps of:

placing the end surfaces of the optical fibers at or opposite each other with the longitudinal axes of the ends of the fibers substantially in parallel to each other, rotating the ends of the fibers about their longitudinal axes in order to have an angular position in relation to each other, so that the axial asymmetries will have the predetermined position in relation to each other, fixing and/or clamping the fiber ends in this position in relation to each other, wherein the step of rotating the ends of fibers in relation to other, comprises the steps of:

determining, by the method as claimed in claim 1, the angular position of each fiber end in relation to a reference angular position or the angular position of the optical asymmetry in relation to the start angular position of the fiber end, and determining a rotation angle for each fiber end from this determined angular position, and rotating each fiber end through the rotation angle determined therefor, the rotation angles being so determined that after the rotations the optical asymmetries of the fiber ends will be substantially aligned with each other.

8. The method as claimed in claim 7, wherein in the step of placing end surfaces of the optical fibers at or opposite each other the longitudinal axes of the ends of the fibers are essentially aligned with each other.

9. The method as claimed in claim 7, wherein in the step of rotating the ends of the fibers about their longitudinal axes the rotating is made to obtain an alignment between the axial asymmetries.

10. The method as claimed in claim 7, wherein after the step of fixing and/or clamping the fiber ends the fiber ends are connected by heating and melting together regions at the end surfaces of the fibers.

11. The method as claimed in claim 7, wherein in the step of determining the angular offset the fiber ends are illuminated from sides of the fiber ends simultaneously by the same light beam.

12. A device for determining, for a cylindrical body which has a longitudinal axis and at least one axial optical asymmetry and which is located in an arbitrary angular start position about the longitudinal axis, of the angular position of the at least one axial optical asymmetry about the longitudinal axis comprising means for illuminating the body with a light beam crossing the body, means for rotating the body through an angular interval having a predetermined first extension being at least half a full turn from its angular start position about its longitudinal axis, means for determining, during the rotation, for different angular positions the difference between the light intensity of light which has passed through the body and in its position corresponds to the central longitudinal portion of the body and of light which has passed through the body and in its position corresponds to the region outside an at the longitudinal central portion of the body, means for determining from the determined differences as a function of the rotation angle from the start angular position at least one rotation angle interval, where the function has its most rapid variation or where the function is strictly decreasing or increasing and has the highest absolute value of its derivative, and means for evaluating the function values within the at least one rotation angle interval for determining a value of the angular position of the least one optical asymmetry in relation to the start angular position of the body or a value of the angular position of the body in relation to some fixed reference angular position of the body.

13. The device as claimed in claim 12, wherein the means for illuminating the body are arranged to provide a parallel light beam having a direction substantially perpendicular to the longitudinal direction of the body.

14. The device as claimed in claim 12, wherein the means for rotating the body are arranged so that the predetermined first extension is a full turn.

15. The device as claimed in claim 12, further comprising means for comparing, after determining the differences as a function of angular values of the first interval, these differences to a predetermined function of the angular argument, this predetermined function having essentially the same basic shape as said difference function, to find an angular value that when used for translating the argument of the predetermined function gives the best agreement between the determined differences and the translated argument function values, this angular translational value being a first value of the angular rotational position of the body, and the means for evaluating the difference function values within the interval or intervals having the most rapid variation being arranged to compare the function values to said predetermined function for different small angular translations of the argument thereof from the first value and to determine that small angular translational value giving the best agreement of the compared functions and to take this translation value as a correction value added to the first value to produce a second, more accurate value of the rotational angular position of the body.

16. The device as claimed in claim 12, wherein the means for determining at least an angular interval are arranged to determine a contiguous interval having a second predetermined angular extension, the second extension being smaller than the first extension, start and end angles of the interval being determined so that the interval contains or coincides with determined intervals where the function has its most rapid variation or so that the interval encloses one interval of steep decrease and one interval of steep increase, where these intervals are separated only by one interval containing a minimum of the function, and the evaluation means being arranged to evaluate the determined differences as a function of the rotation angle over the contiguous interval in order to determine a value of the angular position of the body.

17. The device as claimed in claim 16, wherein the means for determining at least an angular interval are arranged to determine the second predetermined angular extension as equal to 90°.

18. The device as claimed in claim 12, wherein the rotation means are arranged to also rotate the body about its longitudinal axis to a start angle of said contiguous interval and then through this interval, that the means for determining the difference of the light intensities during the rotation are arranged to also determine, for a predetermined second number of different angular positions, the difference between light intensity of light, which has passed through the body and in its position corresponds to the central portion of the body as seen in the longitudinal direction, and of light which has passed through the body and in its position corresponds to regions located most close to and outside the body, the evaluation means being arranged to evaluate these determined differences as a function of the rotation angle over the contiguous interval in order to determine a value of the angular position of the body.

19. A device for splicing ends of two optical fibers to each other, of which fibers each comprises at least one axial asymmetry, where the splice is to be made with a predetermined angle between the angular positions of the axial asymmetries in the two fibers, the ends of the fibers comprising longitudinal directions and end surfaces, the splicing device comprising means for placing the end surfaces of the optical fibers at and opposite to each other with the longitudinal axes of the fibers substantially parallel to each other, means for connecting the fiber ends to each other, means for rotating the ends of the fibers about their longitudinal axes in relation to each other through an angular amount, means for determining the angular position of the optical asymmetry of each fiber end according to claim 12, the rotation means being arranged to use these values for rotating at least one of the fiber ends to align the optical asymmetries of the fiber ends.

20. The device as claimed in claim 19, wherein the means for placing the end surfaces of the optical fibers at and opposite each other are arranged to substantially align the longitudinal axes of the ends of the fibers with each other.

21. The device as claimed in claim 19, wherein the illumination means as claimed in claimed 12 are arranged to provide a light beam arranged to simultaneously and from sides thereof illuminate the fiber ends.

* * * * *